United States Patent
Gies et al.

[11] Patent Number: 5,553,872
[45] Date of Patent: Sep. 10, 1996

[54] SEAL FOR A RECIPROCALLY MOVING BODY

[75] Inventors: Anita Gies, Neustadt; Wolfgang Lipphardt; Ulrich Wüstenhagen, both of Schwalmstadt, Germany

[73] Assignee: Firma Carl Freudenberg, Weinheim, Germany

[21] Appl. No.: 984,404

[22] Filed: Dec. 2, 1992

[30] Foreign Application Priority Data

Dec. 4, 1991 [DE] Germany ............... 41 39 919.6

[51] Int. Cl.$^6$ ................................. F16J 15/32
[52] U.S. Cl. ................ 277/205; 277/212 R; 92/137
[58] Field of Search ................ 277/205, 212 R, 277/212 C, 212 F; 92/137

[56] References Cited

U.S. PATENT DOCUMENTS

| | | | |
|---|---|---|---|
| 1,894,711 | 1/1933 | Schacht ................ | 277/205 X |
| 2,471,897 | 5/1949 | Rappl ................ | 277/212 FX |
| 2,757,947 | 8/1956 | Whitten ................ | 277/205 |
| 2,832,223 | 4/1958 | Couraud ................ | 277/205 X |
| 3,199,831 | 8/1965 | Sully ................ | 277/205 X |
| 5,020,421 | 6/1991 | Podlesak ................ | 92/137 |
| 5,035,171 | 7/1991 | Gottling et al. ................ | 92/137 |
| 5,144,883 | 9/1992 | Müller et al. ................ | 92/137 |
| 5,246,237 | 9/1993 | Göttling et al. . | |

FOREIGN PATENT DOCUMENTS

| | | | |
|---|---|---|---|
| 1327702 | 4/1963 | France ................ | 277/212 C |
| 2404244 | 8/1975 | Germany ................ | 92/137 |
| 3509840C2 | 3/1985 | Germany . | |

Primary Examiner—William A. Cuchlinski, Jr.
Assistant Examiner—Scott W. Cummings
Attorney, Agent, or Firm—Kenyon & Kenyon

[57] ABSTRACT

A seal for a reciprocally moving body that has at least one essentially flat boundary surface extending parallel to its longitudinal axis includes a sealing member that has a first sealing lip formed of polymer material. The first sealing lip extends substantially parallel to the longitudinal axis and abuts the boundary surface. The first sealing lip also has a larger cross-section near a middle portion of the flat boundary surface than in an area of its lateral edges.

2 Claims, 4 Drawing Sheets

SEAL FOR A RECIPROCALLY MOVING BODY

BACKGROUND OF THE INVENTION

The present invention relates to a seal for a reciprocally moving body that has at least one essentially flat boundary surface extending parallel to its longitudinal axis. The seal has a sealing member with a first sealing lip formed of a polymer material. The first sealing lip extends parallel to the longitudinal axis and abuts the boundary surface.

A seal such as described above is generally known and is used, for example, as a rod seal. The medium to be sealed may be compressed air or hydraulic fluid, for example. The seal is not very satisfactory, however, particularly in the middle area of the essentially flat boundary surfaces, especially when elliptical bodies or bodies having essentially flat boundary surfaces are being sealed. As the service life increases, leakiness, as well as associated leakage, occur in this area. The danger of leakage is further increased by eccentricities in the position of the body to be sealed.

The present invention provides a seal of the type discussed above that will allow all the boundary surfaces of the reciprocally moving body to be reliably sealed and its good working properties to be maintained over a long service life.

SUMMARY OF THE INVENTION

The present invention provides a seal for a reciprocally moving body that has at least one essentially flat boundary surface extending parallel to its longitudinal axis. The seal includes a sealing member that has a first sealing lip formed of polymer material. The first sealing lip extends substantially parallel to the longitudinal axis and abuts the boundary surface. The first sealing lip also has a larger cross-section near a middle portion of the flat boundary surface than in an area of its lateral edges.

According to the present invention, the first sealing lip has a larger cross-section in the middle of the flat boundary surface and/or is designed to be shorter than in the area of its lateral edges. In this case, it is advantageous that a nearly constant contact pressure of the first sealing lip is provided over the entire cross-section of the body to be sealed, so that a reliable seal is achieved over a long service life. Moreover, this aspect of the sealing member also provides ease of movement for the reciprocally moving body. Such movement is of considerable importance, particularly in connection with low motive forces. Even eccentricities in the position of the body to be sealed which are within the range of a few tenths of a millimeter do not disadvantageously affect the working properties of the seal.

The first sealing lip can be affixed to a base on the side facing away from the space to be sealed off. The base extends in an essentially radial direction and connects the first sealing lip to an essentially equidirectional second sealing lip, whereby only the second sealing lip can be forced, under a radial pre-stressing, to engage with a static machine part. The sealing member can be snapped into the groove of a housing, for example, so that only the second sealing lip abuts the groove in at least one partial area with radial pre-stressing. Because the base does not also engage with the groove, eccentricities in the reciprocally moving body can be easily tolerated within the range of a few tenths of millimeters, thus guaranteeing a reliable seal. The magnitude of the radial pre-stressing, with which the second sealing lip is affixed to the machine part, as well as the travel distance of the spring of the second sealing lip in the radial direction, should be adapted to the particular conditions that depend on the specific application to which the seal is applied. For example, one application of the sealing member is as a tension-rod seal. This design of the second sealing lip makes it possible to compensate for slight torsions of the body in relation to the static machine part.

The second sealing lip has at least one sealing edge and, according to another aspect of the invention, may surround an annular helical spring in the area of the sealing edge. By providing an annular helical spring, potential effects of relaxation in the second sealing lip, which consists of polymer material, and a resultant decrease in pre-stressing in the direction of the static machine part during the service life, can be avoided. As far as selecting a suitable material is concerned, the pre-stressing can be carried out by a flexible pressure part, which is a unitary component of the second sealing lip.

A particularly uniform contact pressure of the first sealing lip against the body is achieved by designing the varying-sized cross-sections of the sealing lip to blend evenly into one another in a continuous manner.

The seal can be easily manufactured and assembled when the two sealing lips constitute a single component of the sealing member formed only of polymer material. This design is also particularly advantageous from an economic standpoint.

At the bottom of the first sealing lip, in the area of the base, the sealing member may have a supporting surface for the boundary surface. This supporting surface is adapted to the contour of the reciprocally moving body. In this embodiment of the invention, it is advantageous if, in addition to the first sealing lip, the supporting surface also contacts the boundary surface of the body, and further that the sealing member is always guaranteed to be correctly positionally aligned to the contour of the reciprocally moving body. Moreover, it is advantageous if the first sealing lip does not have to guide the sealing member, but rather only has to provide a sealing function. As a result, the dynamically loaded first sealing lip is subject to a particularly low rate of wear and, therefore, good working properties are maintained over a long service life.

According to another aspect of the invention, the base may have an axial extent that is at least one third the size of the axial extent of the first sealing lip. As a result, reinforcements inside the sealing member can be eliminated, and hence the sealing member can be produced more cost-effectively. This aspect of the invention also guarantees that the sealing member will have adequate rigidity over a long service life.

DETAILED DESCRIPTION

Figure 1:
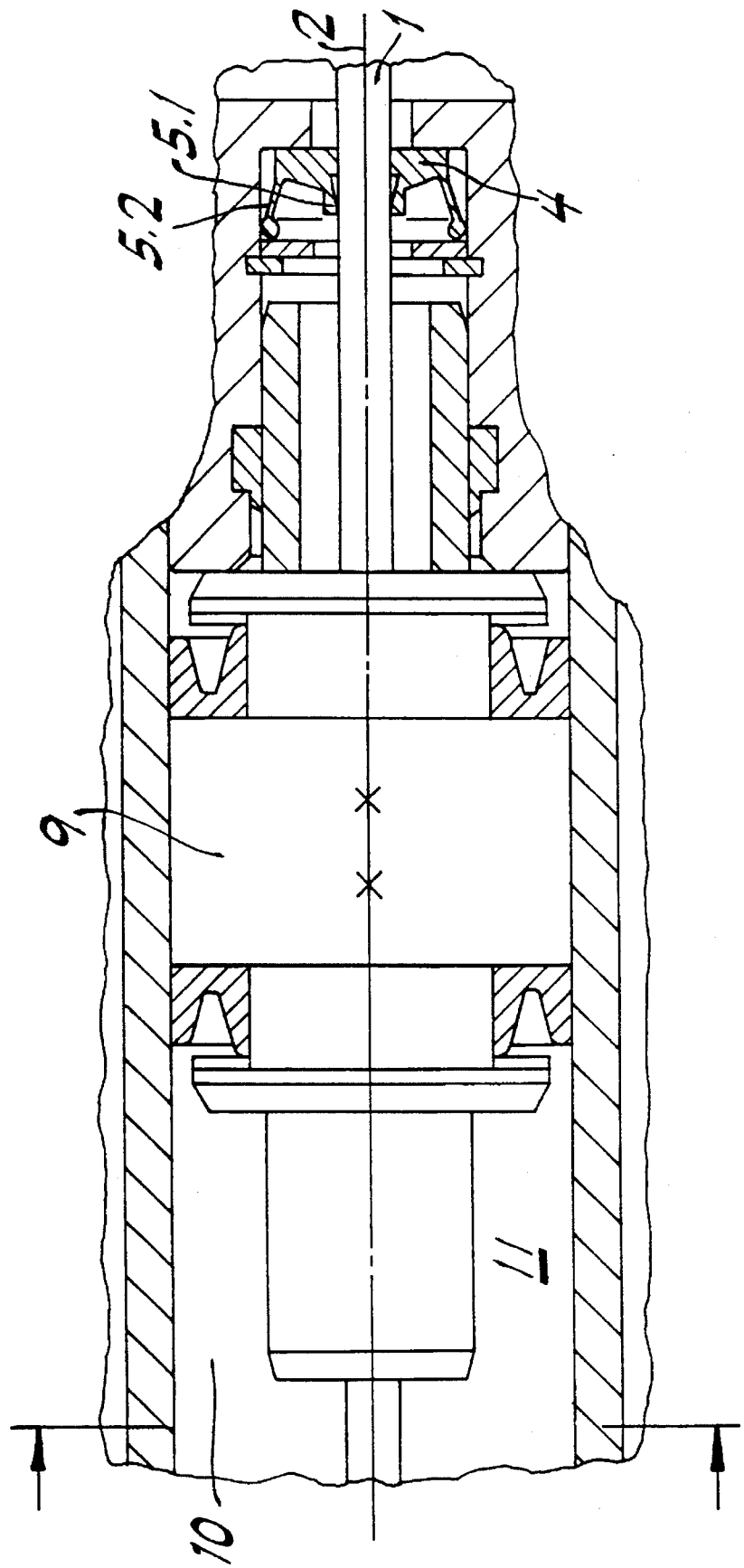
FIGS. 1 and 2 schematically illustrate a cut-away portion of a cylinder construction an a partial cut-away representation, in which the seal according to the invention may be applied, for example.
Figure 2:
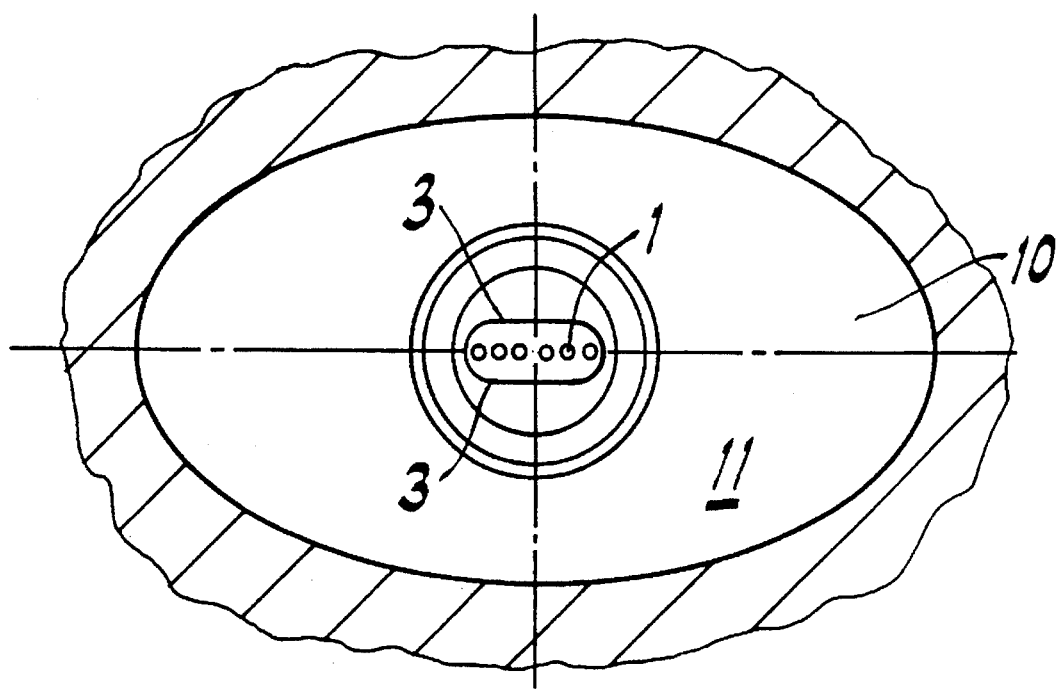

FIGS. 1 and 2 show a cut-away portion of a cylinder construction having a reciprocally moving body 1, which is designed, for example, as a flexurally soft, band-shaped element. The body 1 essentially has two flat boundary surfaces 3, which are interconnected by curved boundary surfaces. The boundary surfaces 3 abut the first sealing lip 5.1 and the supporting surface 6 of the sealing member 4, which is formed from a polymer material.

Figure 3:
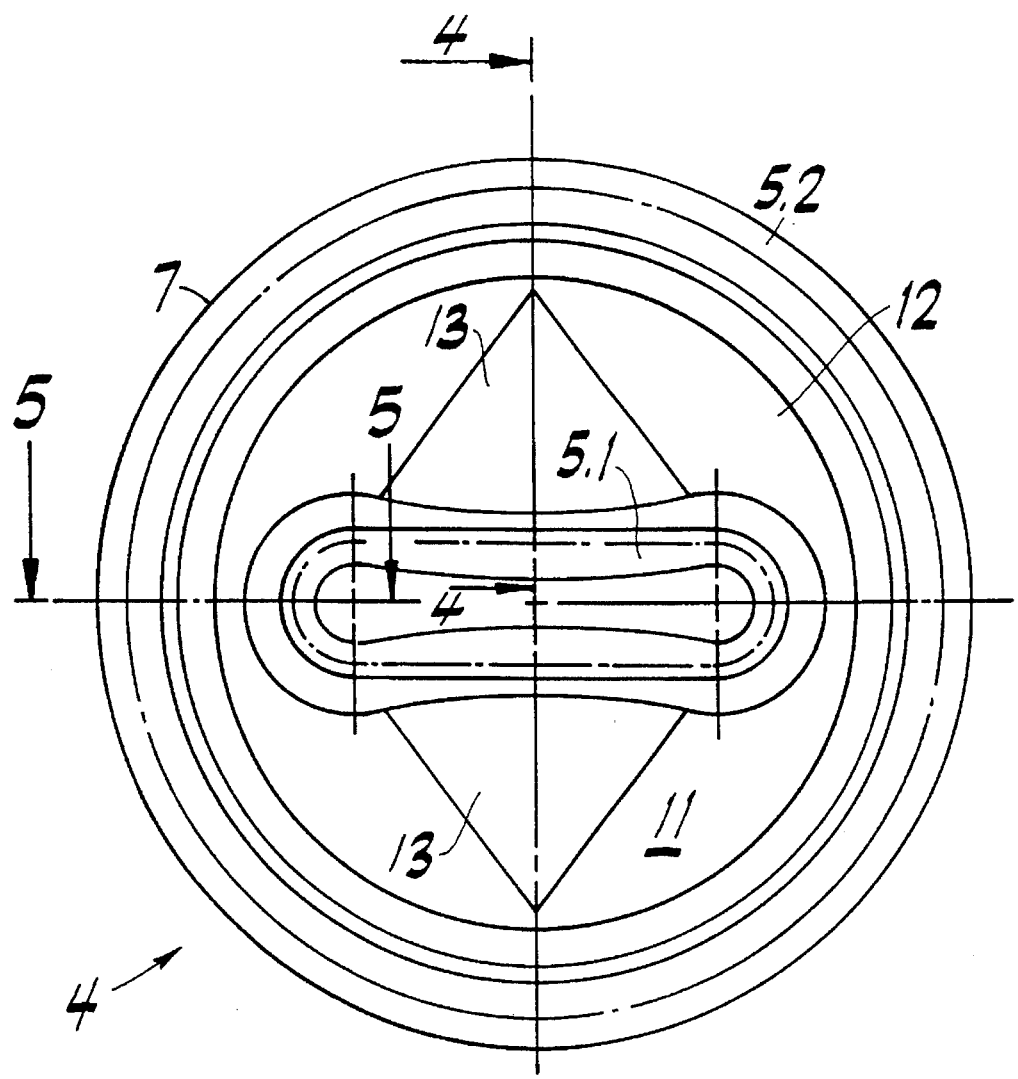
FIG. 3–5 schematically illustrate one embodiment of the sealing member of the present invention, which is provided to seal off the reciprocally moving body shown in FIGS. 1 and 2.
Figure 4:
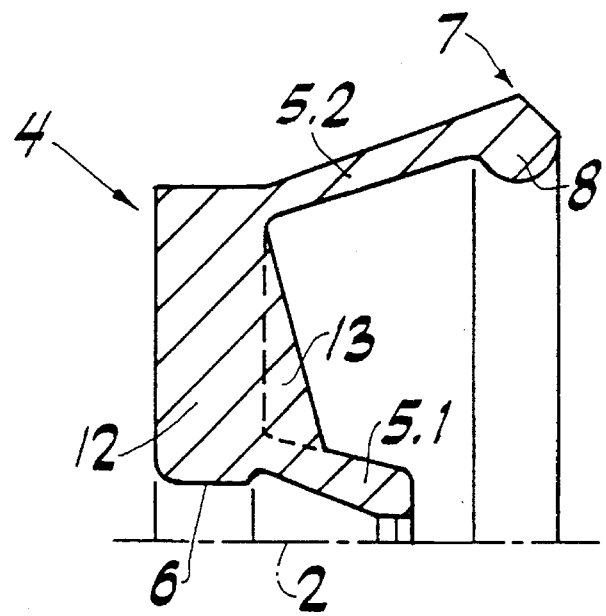
Figure 5:
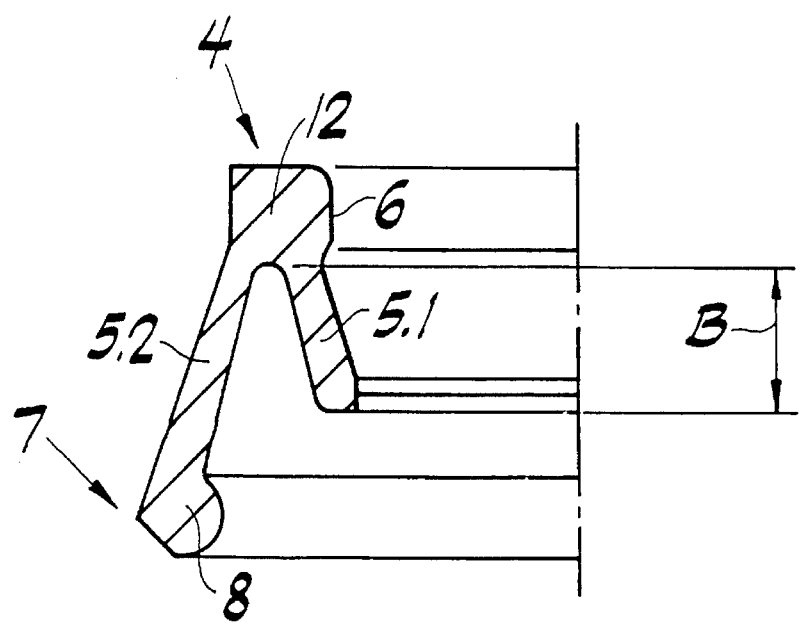

FIGS. 3 through 5 show the sealing member 4 with its first sealing lip 5.1, which has a larger cross-section at the middle of the boundary surfaces 3 of the reciprocally moving body 1 (as viewed from a direction perpendicular to the longitudinal axis 2 shown in FIG. 1), and a shorter configuration than in the area of its lateral edges. In other words, the largest cross-section of the sealing lip 5.1 is along line A–B seen in FIG. 3. As a result, the comparatively wide, flat boundary surfaces 3 of the body 1 are reliably sealed, even over a long surface life. The contact pressure of the first sealing lip 5.1 along the entire periphery of the body 1 is nearly constant.

As seen in FIG. 3, the first sealing lip 5.1 of the sealing member 4 has a convex bulge. The largest cross-section of the first sealing lip 5.1 is situated in the middle of the flat boundary surfaces 3 (not shown here), so that in these areas the contact pressure exerted by the first sealing lip 5.1 is guaranteed. This pressure is nearly as great as in the remaining circumferential areas. In addition to providing a reliable seal, this refinement also provides a nearly uniform, low rate of wear for the dynamically loaded sealing lip 5.1 and good utilization of the entire sealing member 4.

In the embodiment of the invention shown in FIG. 3, the first sealing lip 5.1 is formed from a one-piece component of a sealing ring made solely from a polymer material. At the bottom of the first sealing lip 5.1, a supporting surface 6 is provided for the boundary surface 3. The first sealing lip 5.1 is affixed to a base 12 on the side facing away from the space 11 to be sealed off. The base 12 connects the first sealing lip 5.1 to the second sealing lip 5.2. In addition to having an enlarged cross-section, the first sealing lip 5.1 is also shorter in the middle area of the flat boundary surfaces 3, i.e., it is designed to be less flexible. In this embodiment, conical stiffening ribs 13 allow the first sealing lip 5.1 to be shortened.

FIG. 4 shows a cross-sectional view taken along the line A–B in FIG. 3. In this Figure, the larger cross-section of the first sealing lip 5.1 in the area of the middle of the essentially flat boundary surface 3 is shown, as is the sealing edge 7 of the second sealing lip 5.2 disposed along the circular outer periphery of the sealing member 4. The length of the sealing lip 5.1 is seen to be less than the length of the sealing lip 5.2. A bulge 8 on the radial, inner periphery of the sealing edge 7 assures that the sealing edge 7 is pressed with adequate contact pressure against the circular-cylindrical housing, such as a groove, for example. As an alternative to the bulge 8, an annular helical spring which is affixed in this area may also be provided. In FIG. 4, the shortening of the first sealing lip 5.1 can be easily distinguished by the conical stiffening ribs 13. The first sealing lip 5.1 becomes relatively longer and its flexural stiffness becomes relatively less in the direction of the lateral edges of the flat boundary surfaces. In other words, the stiffness of the sealing lip 5.1 increases along its length from its front end farthest from the supporting surface 6 to its bottom end contacting the supporting surface 6. The relatively short and flexible portion of the first sealing lip 5.1 is indicated in FIG. 4 by the length A.

FIG. 5 shows a view of the invention taken along line C–D in FIG. 3. In this view, the relatively smaller cross-section of the first sealing lip 5.1 in the area of the lateral edges of the boundary surfaces 3, as well as its greater length can be seen. The flexible portion of the sealing lip 5.1 extends over its entire axial length, as indicated by the length B. The sealing edge 7, the bulge 8, the second sealing lip 5.2 and the supporting surface 6 are shown in this Figure as well.

The following discussion refers to the operation of the invention. According to FIG. 1, an oval piston 9, which is locked to prevent rotation, is pressurized in a closed cylinder 10 having a corresponding cross-section. As a result, the piston 9 moves in the direction of the longitudinal axis 2 of the reciprocally moving body 1, which is to be sealed, without turning in the cylinder 10. The piston 9 is directly connected to a longitudinally displaceable part (not shown here) via the body 1, which in the illustrated embodiment is a tension rod. The movement of the piston 9 can be transferred directly, or by way of a deflection. The pressure space in the cylinder 10 is sealed off to the atmosphere. On the one hand, the sealing member 4 seals off the reciprocally moving body 1 and aligns itself to the dimensionally stable base 12 and the first sealing lip 5.1. On the other hand, the sealing member 4 aligns itself by means of the supporting surface 6 arranged at the bottom of the first sealing lip 5.1, always according to the position of the boundary surfaces, even when the body 1 is in an eccentric or incorrect position.

A nearly constant contact pressure against the boundary surface of the body 1 over the entire periphery is guaranteed by the form of the first sealing lip 5.1, because the first sealing lip 5.1 has a convex shape and, in the middle area of the flat boundary surfaces 3, has a larger cross-section and a shorter design than in the area of its lateral edges. In this case, the stiffening ribs 13 have a conical design and, in addition, act as reinforcement for the first sealing lip 5.1. The sealing of the housing is circular and is achieved by means of a sealing edge 7, which has a bulge 8 pressing against the housing. The base 12 and the second sealing lip 5.2 do not sealingly abut a groove—as is customarily the case—but rather only the second sealing lip 5.2 forms such a seal. Depending upon the conditions that prevail, the base 12 is situated with radial clearance next to the bottom of the groove. This configuration ensures an excellent seal, as well as allowing the body 1 to be readily movable within the sealing member 4, even when the body 1 is positioned eccentrically.

What is claimed is:

1. A seal for a reciprocally moving body that has at least one essentially flat boundary surface extending parallel to its longitudinal axis, said seal comprising:

a sealing member having a first sealing lip formed of polymer material, said first sealing lip extending substantially parallel to the longitudinal axis and abutting said boundary surface, wherein the cross-section of said first sealing lip, taken in a plane perpendicular to the longitudinal axis, is larger near a middle portion of the flat boundary surface of the reciprocally moving body than in an area of lateral edges of the reciprocally moving body, and wherein the axial extent of said first sealing lip is designed to be shorter near the middle portion than in an area of the lateral edges.

2. A seal for a reciprocally moving body that has at least one essentially flat boundary surface extending parallel to its longitudinal axis, said seal comprising: a sealing member having a first sealing lip formed of polymer material, said first sealing lip extending substantially parallel to the longitudinal axis and abutting said boundary surface, wherein the axial extent of said first sealing lip is designed to be shorter near a middle portion of the flat boundary surface of the reciprocally moving body than in an area of lateral edges of the reciprocally moving body.

* * * * *